UNITED STATES PATENT OFFICE.

ADRIANUS JOHANNES LEONARDUS TERWEN AND CORNELIS JOHANNES CHRISTIAAN VAN HOOGENHUYZE, OF AMSTERDAM, NETHERLANDS.

PROCESS FOR THE MANUFACTURE OF DECOLORIZED, ODORLESS, AND TASTELESS ALBUMINS FROM BLOOD.

1,415,277.　　　　Specification of Letters Patent.　　Patented May 9, 1922.

No Drawing.　　Application filed September 30, 1918. Serial No. 256,362.

*To all whom it may concern:*

Be it known that we, ADRIANUS JOHANNES LEONARDUS TERWEN and Dr. CORNELIS JOHANNES CHRISTIAAN VAN HOOGENHUYZE, both subjects of the Queen of the Netherlands, and residing at Amsterdam, in the Province of North Holland, in the Kingdom of the Netherlands, have invented certain new and useful Improved Process for the Manufacture of Decolorized, Odorless, and Tasteless Albumins from Blood, of which the following is a specification.

The present invention relates to the manufacture of colorless, odorless and tasteless albumin from blood; and its object, briefly stated, is to improve the methods heretofore adopted, the product obtained by the present process being capable of use as a binding agent in confectionery, as a constituent of medicinal and food preparations, and as a finishing agent in textile manufacture.

According to the known methods, it has been proposed to treat the blood with hydrogen peroxide, after having removed the catalase, which is an enzym contained in blood having the property of splitting up the hydrogen peroxide ($H_2O_2$) into $H_2O$ and O, the latter gas escaping in the form of gas bubbles; the thus decomposed peroxide being incapable of oxidizing hematin, which of course, is necessary in order to obtain a colorless product. To effect the removal of the catalase, the raw material initially is mixed with sulfurous acid and ammonia, after which an alkali, preferably ammonia, is added to the liquid which is finally boiled with the hydrogen peroxide, and the albumin, so far as not precipitated, is completely separated out by neutralization. Albumin thus obtained has the disadvantage, however, that it is not soluble in water and, hence, cannot be satisfactorily utilized for the purposes above indicated.

We have found that soluble, decolorized, odorless and tasteless albumin may be obtained from blood if the latter be initially treated with a dilute acid and allowed to stand for a considerable time, and hydrogen peroxide then added. After the mixture has again been allowed to stand for a considerable time, the acid is neutralized and decolorizing is effected at ordinary temperature without the formation of a precipitate. The action of the acid is to split up the oxyhemaglobin into hematin and globin, and at the same time to commence the destruction of the catalase, which is completed while the decolorizing of the hematin by the added hydrogen peroxide is taking place, decolorization being completed by the neutralizing of the acid. We have obtained decolorization by first neutralizing the acidulated blood and then subjecting it to the hydrogen peroxide treatment; but because the catalase is still insufficiently destroyed, there is a strong evolution of oxygen, with consequent foaming. Hence it is obvious that the presence of the hydrogen peroxide in the acidulated liquid plays an important part in rendering the catalase inactive.

The quantity of acid required will differ with the particular acid used. When employing hydrochloric acid, and taking equal parts of blood and diluted acid, the concentration will vary between 0.20 and 0.35 normal, and the quantity of 3% hydrogen peroxide should be at least 75% of the blood, while the quantity of alkali used should be about 10% more than is necessary to neutralize the acid.

It is an advantage of our method that all heating may be dispensed with, and the desired water-soluble albumin obtained at ordinary temperature. However, there is no essential objection against heating; and as a matter of fact the temperature may be raised, even to a high degree, immediately after the alkali has been added, with a resultant acceleration of the decolorizing action but without causing the albumin to become insoluble. The albumin may be obtained in a dry form by evaporating the decolorized liquid, preferably at a low temperature, for instance in vacuo. The decolorized liquid may be sterilized, if desired, by boiling it even above 100° C., the albumin retaining its solubility both in this case and when evaporated.

The following may be given as an example: 100 cubic centimeters of completely defibrinated blood are mixed with 100 cubic centimeters of 0.3 normal hydrochloric acid. As the red corpuscles are dissolved, the red color changes to black, due to the splitting up of the hemaglobin into black hematin and globin. After 24 hours, during which time the liquid becomes more or less sirupy, 150 cubic centimeters of 3% hydrogen peroxide are added, whereupon the liquid becomes thin again. In the course of several hours, a slight evolution of oxygen takes place, and after 24 hours the liquid is partly decolorized. 33 cubic centimeters of normal alkali (a slightly excessive quantity relative to the quantity of hydrochloric acid used) are then added; and after a few hours, the decolorization is completed under a slight evolution of oxygen, the liquid remaining clear throughout the entire treatment. The liquid may then be evaporated, or it may be boiled and even sterilized, as above stated, without impairing the solubility of the albumin.

It will be understood that bloodclot may be utilized in carrying out the process, and that the term "blood" is intended to cover that substance.

We claim as our invention:

The process of obtaining decolorized, ordorless and tasteless water-soluble albumin from blood, which comprises subjecting the blood to a protracted treatment with a dilute acid; adding hydrogen peroxide and allowing the liquid to stand, and thereafter adding an alkali to neutralize the blood and allowing the liquid to stand until completely decolorized.

In testimony whereof we have hereunto set our hands.

ADRIANUS JOHANNES LEONARDUS TERWEN.
DR. CORNELIS JOHANNES
       CHRISTIAAN van HOOGENHUYZE.

Witnesses:
M. AHURADOZ.
D. KLEIJA,